US012524328B2

(12) United States Patent
Kato (10) Patent No.: US 12,524,328 B2
(45) Date of Patent: Jan. 13, 2026

(54) CONTROL DEVICE, CONTROL METHOD, AND STORAGE MEDIUM (71) Applicant: HONDA MOTOR CO., LTD., Tokyo (JP)

(72) Inventor: Hisahiro Kato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/451,908

(22) Filed: Aug. 18, 2023

(65) Prior Publication Data

US 2024/0103999 A1 Mar. 28, 2024

(30) Foreign Application Priority Data

Sep. 28, 2022 (JP) .................... 2022-154375

(51) Int. Cl.
*G06F 11/36* (2025.01)
*B60W 40/105* (2012.01)
*G06F 9/30* (2018.01)
*G06F 11/30* (2006.01)
*G06F 11/3604* (2025.01)

(52) U.S. Cl.
CPC ....... *G06F 11/3612* (2013.01); *B60W 40/105* (2013.01); *G06F 9/30189* (2013.01); *G06F 11/3024* (2013.01); *B60W 2520/10* (2013.01)

(58) Field of Classification Search
CPC .......... G06F 11/3612; G06F 11/3024
USPC ................................. 714/38.1, 25
See application file for complete search history.

(56) References Cited

U.S. PATENT DOCUMENTS

| 8,401,758 B2* | 3/2013 | Stahlin ............. G08G 1/096741 701/70 |
| 2009/0254243 A1 | 10/2009 | Uchihashi et al. |
| 2013/0016766 A1* | 1/2013 | Soma ..................... H04B 1/082 375/224 |
| 2013/0061098 A1* | 3/2013 | Shigehara ............... G06F 11/24 714/47.1 |
| 2017/0322867 A1* | 11/2017 | Jiao ...................... G06F 11/2236 |
| 2018/0137000 A1 | 5/2018 | Yokoyama |
| 2021/0286693 A1 | 9/2021 | Alben et al. |

(Continued)

FOREIGN PATENT DOCUMENTS

| JP | 2009-40348 A | 2/2009 |
| JP | 2018-041130 A | 3/2018 |

(Continued)

OTHER PUBLICATIONS

Japanese Office Action dated Apr. 16, 2024 issued in corresponding Japanese application No. 2022-154375; English machine translation included (9 pages).

(Continued)

*Primary Examiner* — Chae M Ko
(74) *Attorney, Agent, or Firm* — Rankin, Hill & Clark LLP (57) ABSTRACT A control device, which controls a device equipped in a vehicle by executing a program, the control device comprising: a storage unit that stores the program; and a processor, the processor being configured to be capable of executing a verification operation of partially executing and verifying the program after starting execution of the program stored in the storage unit, and change an execution mode of the verification operation according to a load state of the processor.

4 Claims, 6 Drawing Sheets (56) References Cited

U.S. PATENT DOCUMENTS

2023/0050149 A1* 2/2023 Shimamura ......... G06F 11/1641
2023/0252824 A1* 8/2023 Merg .................... G07C 5/006
                                                                701/29.4

FOREIGN PATENT DOCUMENTS

| | | |
|---|---|---|
| JP | 2018-81427 A | 5/2018 |
| JP | 2021-179762 A | 11/2021 |
| WO | 2008/038741 A1 | 4/2008 |
| WO | 2021/166167 A1 | 8/2021 |

OTHER PUBLICATIONS

Japanese Office Action dated Nov. 26, 2024 issued in corresponding Japanese application No. 2022-154375; English machine translation included (9 pages).

* cited by examiner

FIG.6

CONTROL DEVICE, CONTROL METHOD, AND STORAGE MEDIUM

INCORPORATION BY REFERENCE

The present application claims priority under 35 U.S.C. § 119 to Japanese Patent Application No. 2022-154375 filed on Sep. 28, 2022. The content of the application is incorporated herein by reference in its entirety.

BACKGROUND OF THE INVENTION

Field of the Invention

The present invention relates to a control device, a control method, and a storage medium.

Description of the Related Art

In recent years, functions of software installed in a vehicle have evolved for the purpose of improving traffic safety and improving comfortability of the vehicle. As the functions of software have evolved, the structure of programs has become more complex, so there has been a need for means of verifying that the behavior of the software is normal. For example, a method of executing an in-vehicle control program and monitoring execution contents is disclosed in Japanese Patent Laid-Open No. 2018-41130. In the method disclosed in Japanese Patent Laid-Open No. 2018-41130, creation or transmission of run-time data of the program is executed by DMA transfer without using a CPU in order to solve the problem of a processing load being imposed on the CPU due to the process of monitoring the execution contents of the in-vehicle control program, preventing proper operation of the control program, which would otherwise be executed.

In Japanese Patent Laid-Open No. 2018-41130, a technique of processing data with DMA transfer instead of CPU is applied to the in-vehicle control program, and there have limitations on applicable hardware and software structures. For this reason, there is a problem that opportunities to verify the software are limited so as not to interfere with the control while the control based on the software is being executed.

An object of the present invention, which has been made in view of such a circumstance, is to increase opportunities for verifying software that controls vehicle equipment, and to contribute to the advancement of sustainable transport systems.

SUMMARY OF THE INVENTION

A first aspect of the present invention provides a control device that controls a device equipped in a vehicle by executing a program, the control device including: a storage unit that stores the program; and a processor, the processor being configured to be capable of executing a verification operation of partially executing and verifying the program after starting execution of the program stored in the storage unit, and change an execution mode of the verification operation according to a load state of the processor.

In the control device according to the first aspect of the invention, the processor is configured to determine the load state of the processor based on a traveling state of the vehicle, and change the execution mode of the verification operation according to a determination result.

In the control device according to the first aspect of the invention, the processor is configured to determine the load state of the processor based on a function of the vehicle related to the program and the traveling state of the vehicle, and change the execution mode of the verification operation according to a determination result.

In the control device according to the first aspect of the invention, the processor is configured to: execute the program related to traveling control of the vehicle; be capable of setting an execution frequency of the verification operation to a first frequency and a second frequency lower than the first frequency; and set the execution frequency of the verification operation to the second frequency when a speed of the vehicle is equal to or greater than a first speed and set the execution frequency of the verification operation to the first frequency when the speed of the vehicle is equal to or lower than a second speed.

In the control device according to the first aspect of the invention, the processor is configured to: execute the program related to equipment that operates when a user ascends or descends the vehicle; be capable of setting an execution frequency of the verification operation to a third frequency and a fourth frequency higher than the third frequency; and set the execution frequency of the verification operation to the fourth frequency when a speed of the vehicle is equal to or greater than a first speed and set the execution frequency of the verification operation to the third frequency when the speed of the vehicle is equal to or lower than a second speed.

A second aspect of the present invention provides a control method in which a control device including a storage unit and a processor executes a program stored in the storage unit to control a device equipped in a vehicle, the control method by the processor including: executing a verification operation of partially executing and verifying the program after starting execution of the program stored in the storage unit; and changing an execution mode of the verification operation according to a load state of the processor.

A third aspect of the present invention provides a storage medium storing a control program to be executed by a control device that includes a storage unit and a processor and controls a device equipped in a vehicle, the control program causing the processor to: be capable of executing a verification operation of partially executing and verifying the program after the processor starts execution of the program stored in the storage unit; and change an execution mode of the verification operation according to a load state of the processor.

According to the above aspects of the present invention, since the control device for controlling the device equipped in the vehicle can verify the program that controls the device while reducing the influence on the control of the device, opportunities to verify the program can be increased. Therefore, it is possible to stabilize the operation of the program and prevent inappropriate behavior of the program, which can contribute to the advancement of sustainable transport systems.

DETAILED DESCRIPTION OF THE PREFERRED EMBODIMENT

Figure 1:
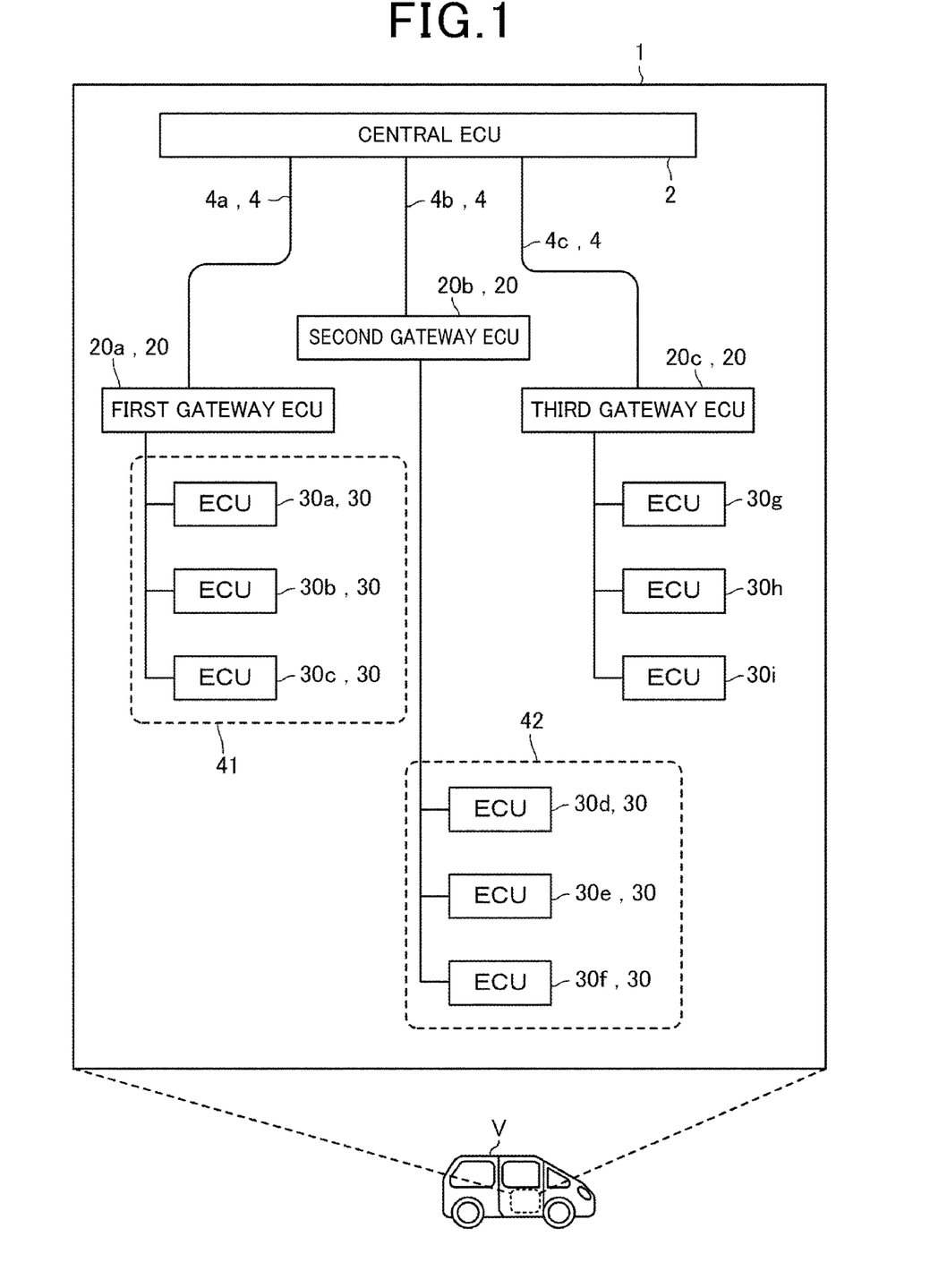
FIG. 1 is a diagram showing a vehicle control system.

FIG. 1 is a diagram showing a vehicle control system 1. The vehicle control system 1 is equipped in a vehicle V and includes a central ECU 2 that performs overall control of the vehicle V and information processing. The central ECU 2 is connected to communication lines including communication lines 4a, 4b, and 4c. The central ECU 2 implements a function of a gateway that manages exchange of communication data between these communication lines. The central ECU 2 may be connected with, for example, a TCU (Telematics Control Unit) (not shown) that is a wireless device in compliance with a communication standard of a mobile communication system. The central ECU 2 uses a communication function of the TCU to execute OTA (Over The Air) management, for example. The OTA management includes control related to processing for downloading an update program for an in-vehicle device provided in the vehicle V from a server outside the vehicle and processing for applying the downloaded update program to the in-vehicle device.

The communication lines 4a, 4b, and 4c are connected with a first gateway ECU 20a, a second gateway ECU 20b, and a third gateway ECU 20c, respectively. There are no limits on the number and type of ECUs connected to the first gateway ECU 20a, the second gateway ECU 20b, and the third gateway ECU 20c, and one configuration example is shown in the present embodiment. In this example, the first gateway ECU 20a is connected with ECUs 30a, 30b, and 30c. The second gateway ECU 20b is connected with ECUs 30d, 30e, and 30f. In addition, the third gateway ECU 20c is connected with ECUs 30g, 30h, and 30i.

Hereinafter, the first gateway ECU 20a, the second gateway ECU 20b, and the third gateway ECU 20c will be collectively referred to as a gateway ECU 20, and the ECUs 30a to 30i will also be collectively referred to as an ECU 30.

The gateway ECUs 20 are connected to the plurality of ECUs 30 arranged in the same section in a body space of the vehicle V, or the plurality of ECUs 30 for controlling operations of devices arranged in the same section, respectively. Here, the devices include equipment such as motors, sensors, and other devices.

The central ECU 2 can be connected with other controllers and devices in addition to the gateway ECU 20. Such controllers and devices may include, for example, ICBs (Infotainment Control Box), speakers, microphones, meter panels, steering switches, GNSS (GNSS; Global Navigation Satellite System) sensors, and touch panels.

In the present embodiment, the communication lines 4a, 4b, and 4c are composed of, for example, CAN buses that perform communication in compliance with a CAN communication standard. Hereinafter, the communication lines 4a, 4b, and 4c will be also collectively referred to as a communication line 4.

The gateway ECU 20 connected to the communication line 4 delivers data to be sent to the communication line 4 in a single frame or as a sequence of a plurality of frames according to the CAN communication standard in the related art. According to the CAN communication standard, each of the frame delivered includes an identification code (ID), and the gateway ECU 20 receiving the corresponding frame determines based on the ID included in the corresponding frame whether the corresponding frame is a frame transmitted to itself.

There are no particular limits on the types and functions of the ECUs 30 connected to the first gateway ECU 20a, the second gateway ECU 20b, and the third gateway ECU 20c. In the present embodiment, the vehicle control system 1 includes a traveling system ECU 41 including the ECUs 30a, 30b, and 30c and a body system ECU 42 including the ECUs 30d, 30e, and 30f. A distinction between the traveling system ECU 41 and the body system ECU 42 corresponds to functions of the vehicle V.

The ECU 30 included in the traveling system ECU 41 is an ECU 30 that controls devices related to traveling of the vehicle V. The ECU 30 included in the traveling system ECU 41 controls, for example, a driving motor that causes the vehicle V to travel, an internal combustion engine as a driving source for the vehicle V, a steering unit such as an accelerator or a brake, and a VSA device (VSA; Vehicle Stability Asist). The traveling system ECU 41 may include an ECU 30 related to a driving support function for supporting the driving of the vehicle V and an autonomous driving function. An example of this type of ECU 30 may include an ADAS-ECU (ADAS; Advanced Driver-Assistance System).

The ECU 30 included in the body system ECU 42 controls devices, which are not directly involved in traveling of the vehicle V, among equipment attached to the vehicle body of the vehicle V. Specifically, these devices include devices that do not change a traveling state of the vehicle V, and may include devices necessary for the traveling of the vehicle V. For example, the ECU 30 included in the body system ECU 42 controls a battery, a lamp body such as a head lamp, equipment that operates when a user ascends or descends the vehicle V, a temperature sensor, a vehicle exterior camera, and an in-vehicle camera. Examples of the equipment that operates when the user ascends or descends the vehicle V may include doors, a rear gate, and sensors attached to the doors and the rear gate, and may specifically include window motors that drive door windows, actuators that drive door lock mechanisms, motors that operate doors, door lock sensors, and door opening/closing sensors. Further, the ECU 30 included in the body system ECU 42 may include an ECU 30 that controls devices related to infotainment functions in the vehicle V, and an ECU 30 that executes the infotainment function. Examples of the infotainment functions may include functions related to music playback, reception and viewing of radio and television broadcasts, playback of music and video distributed using networks such as the Internet, and execution of video games.

In addition to the traveling system ECU 41 and the body system ECU 42, the ECU 30 included in the vehicle control system 1 may include ECUs of an MPU (Map Positioning Unit), an MVC-ECU (MVC; Multi View Camera), and a PKS-ECU (PKS; Parking Support), and ECUs that control operations of various devices and sensors provided in the vehicle V.

The configuration in FIG. 1 is an example. For example, the ECU 30 included in the traveling system ECU 41 may be distributed and connected to the first gateway ECU 20a, the second gateway ECU 20b, and the third gateway ECU 20c. In addition, the first gateway ECU 20a may be connected with an ECU 30 other than the traveling system ECU 41. This also applies to the ECU 30 included in the body system ECU 42.

Figure 2:
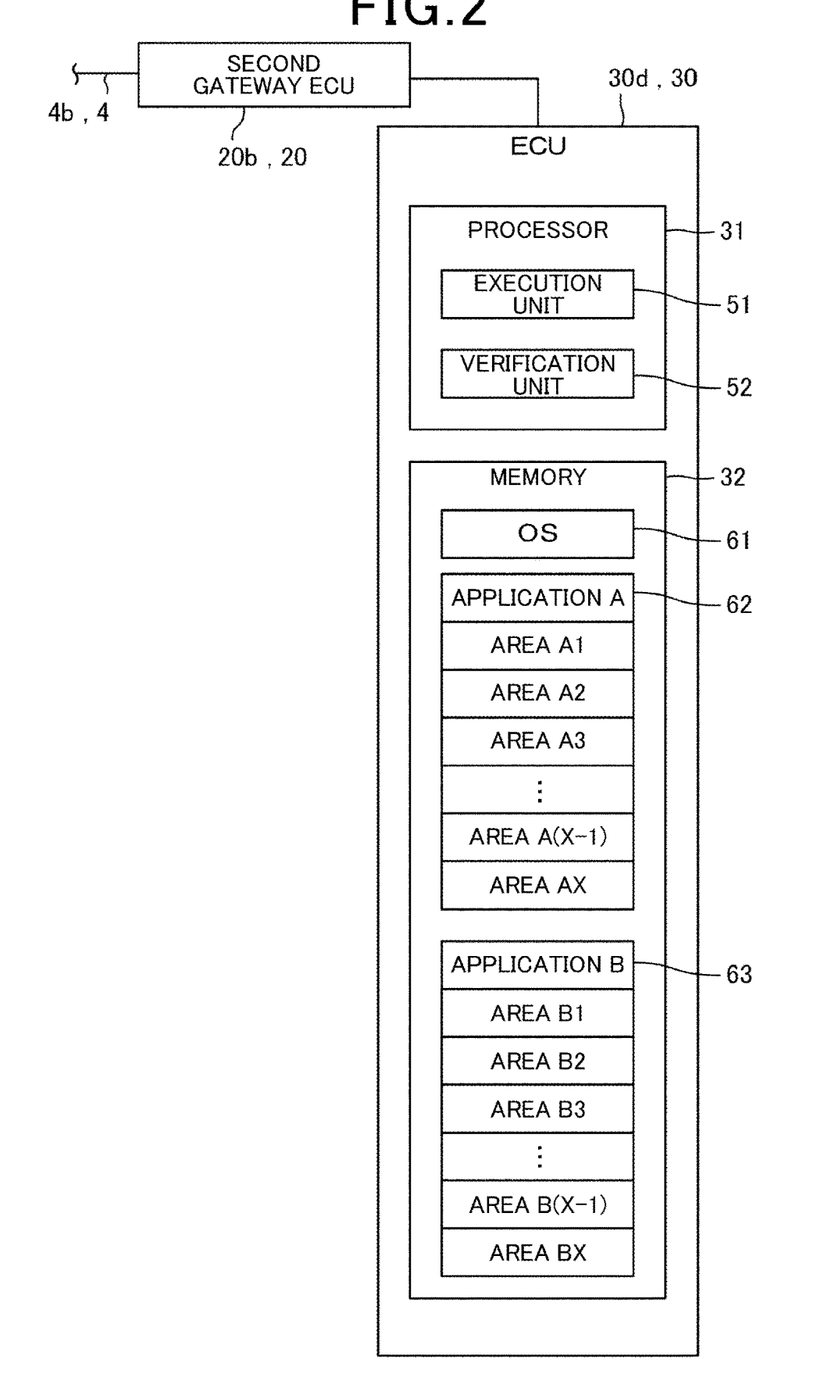
FIG. 2 is a block diagram showing a configuration example of main components of the vehicle control system.

FIG. 2 is a block diagram showing a configuration example of main components of the vehicle control system 1, and shows configurations of the second gateway ECU 20*b* and the ECU 30*d* connected to the second gateway ECU 20*b*. The ECU 30*d* is the ECU 30 belonging to the body system ECU 42.

The ECU 30*d* includes a processor 31 and a memory 32. The processor 31 is composed of, for example, a CPU (Central Processing Unit), an MCU (Micro Controller Unit), or an MPU (Micro Processor Unit). The memory 32 stores programs executed by the processor 31 and data processed by the processor 31 in a non-volatile manner. The memory 32 is composed of a ROM (Read Only Memory), for example. The memory 32 may include a RAM (Random Access Memory) that forms a work area for temporarily storing programs and data. In the present disclosure, the ECU 30*d* corresponds to an example of a controller. The ECU 30*d* may be composed of an integrated circuit that integrally includes the processor 31 and the memory 32. Further, the ECU 30*d* may include, as independent hardware, the processor 31, the memory 32, and other circuits. The memory 32 corresponds to an example of a storage unit.

The memory 32 stores an OS (Operating System) 61, an application A 62, and an application B 63. The OS 61 is a basic control program to be executed by the processor 31. The execution of the OS 61 by the processor 31 implements a basic function of the ECU 30*d*, and constitutes a platform for the processor 31 to execute application programs.

The application A 62 and the application B 63 are examples of application programs executed by the ECU 30*d*. The application programs executed by the ECU 30*d* are not limited to the application A 62 and the application B 63. The ECU 30*d* may be capable of executing three or more application programs. Further, the application A 62 and the application B 63 may be program modules included in one application program.

The processor 31 includes an execution unit 51 and a verification unit 52. These units are functional units that are realized when the processor 31 executes the OS 61. The execution unit 51 executes the application A 62 and the application B 63. When the execution unit 51 executes either or both of the application A 62 and the application B 63, the ECU 30*d* can control the device connected to the ECU 30*d*.

The verification unit 52 verifies whether the application A 62 and the application B 63 operate normally. When the application A 62 and the application B 63 are installed in the ECU 30*d* in an incomplete state by the verification of the verification unit 52, a case where the application A 62 and the application B 63 are not normally executed due to corruption of data and a case where the application A 62 and the application B 63 are inappropriately modified can be found.

As will be described below, the verification unit 52 verifies the application A 62 before the execution unit 51 executes the application A 62. In this case, the execution unit 51 executes the application A 62 in a verification environment, for example, a virtual machine for verification, to start and operate the application A 62. The execution unit 51 compares behavior of the application A 62 being executed and a processing result of the application A 62 with a normal operation, and determines whether the application A 62 normally operates. Similarly, the verification unit 52 verifies the application B 63 before the execution unit 51 executes the application B 63.

The verification unit 52 can verify either the application A 62 or the application B 63 while the execution unit 51 executes the application A 62 or the application B 63. In this case, the verification unit 52 operates in a background at the time of the operation of the execution unit 51, and verifies the application A 62 or the application B 63. The processor 31 causes the execution unit 51 to execute the application A 62 or the application B 63 and executes background processing of the verification unit 52. For example, the processor 31 causes the verification unit 52 to perform background processing when the execution unit 51 does not occupy processing of the processor 31.

The verification unit 52 executes a part of the application A 62 in the verification environment when verifying the application A 62 by the background processing while the execution unit 51 is operating. Similarly, the verification unit 52 executes a part of the application B 63 in the verification environment when verifying the application B 63 by the background processing while the execution unit 51 is operating.

The application A 62 can be divided into a plurality of areas. For example, the application A 62 is divided into areas A1, A2, A3, . . . , A(X−1), and AX shown in FIG. 2 by the verification unit 52. The application A 62 may be configured as being dividable into the areas A1 to AX. Specifically, the areas A1 to AX may be modules that are individually executable by the verification unit 52. Alternatively, the application A 62 may be composed of a set of a plurality of programs, and the areas A1 to AX may be programs executable individually. Further, the application A 62 may be configured as an integrated program, and the verification unit 52 may divide the application A 62 into the areas A1 to AX.

Like the application A 62, the application B 63 can be divided into a plurality of areas. For example, the application B 63 is divided into areas B1, B2, B3, . . . , B(X−1), and BX shown in FIG. 2 by the verification unit 52. The application B 63 may be configured as being dividable into the areas B1 to BX. Specifically, the areas B1 to BX may be modules that are individually executable by the verification unit 52. Alternatively, the application B 63 may be composed of a set of a plurality of programs, and the areas B1 to BX may be programs executable individually. Further, the application B 63 may be configured as an integrated program, and the verification unit 52 may divide the application B 63 into the areas B1 to BX.

Although the configuration of the ECU 30*d* shown in FIG. 2 is an example, the ECUs 30 other than the ECU 30*d* among the ECUs 30 included in the vehicle control system 1 are configured as in the ECU 30*d*. Among the ECUs 30 included in the vehicle control system 1, the ECUs 30 at least included in the traveling system ECU 41 and the ECUs 30 included in the body system ECU 42 include the execution unit 51 and the verification unit 52, like the ECU 30*d*. These ECUs 30 have application programs, which can be divided, like the application A 62 or the application B 63, and the application program can be divided and verified by the verification unit 52 while the application program is being executed. The number and type of the application programs executed by each of the ECUs 30 are not limited, and can be changed as appropriate according to the use and functions of the ECUs 30.

The ECU 30 corresponds to an example of a controller, and causes the processor 31 to execute programs. The ECU 30 belonging to the traveling system ECU 41 is an example of a controller that executes a program related to traveling control of the vehicle V, and the ECU 30 belonging to the body system ECU 42 is an example of a controller that executes a program related to equipment that operates when the user ascends or descends the vehicle V.

Figure 3:
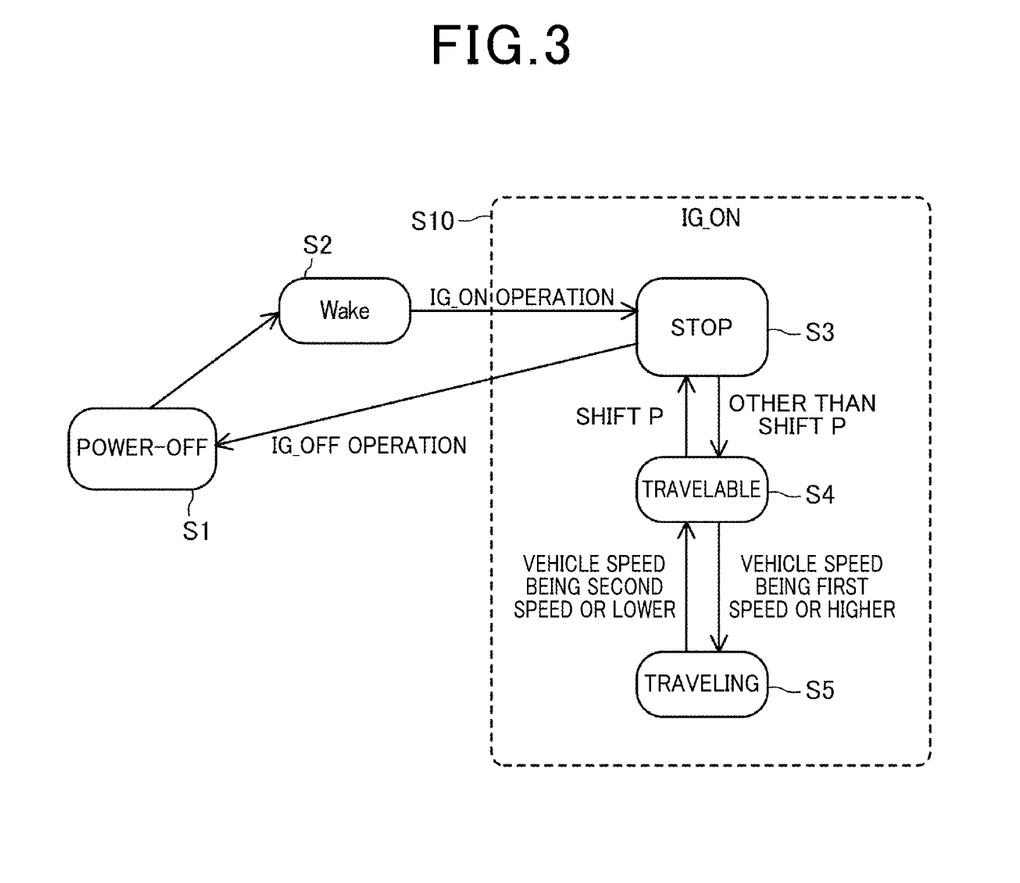
FIG. 3 is a state transition diagram showing an operating state of a vehicle.

FIG. 3 is a state transition diagram showing an operating state of the vehicle V.

States S1 to S5 shown in FIG. 3 indicate operating states of the vehicle V. A power-off state S1 is a state in which the vehicle control system 1 is powered off and the driving source for the vehicle V is stopped. The power-off state S1 is, for example, a state in which the vehicle V is parked and the user such as a driver does not exist near the vehicle V.

In the power-off state S1, when an operation of releasing a door lock of the vehicle V is performed, the vehicle control system 1 starts operating, and the state makes a transition to a Wake state S2. In the Wake state S2, operations of respective units of the vehicle control system 1 are initialized and start up. For example, the central ECU 2 and the gateway ECU 20 detect states of the plurality of ECUs 30 constituting the vehicle control system 1 and states of the devices connected to the ECUs 30 in the Wake state S2. In addition, for example, the ECU 30d executes the OS 61 in the Wake state S2, and each of the units of the ECU 30d can be controllable by the processor 31. After the start of operation of the central ECU 2 in the vehicle control system 1, the gateway ECU 20, and the ECU 30 related to the start of operation of the vehicle control system 1 is completed, the vehicle control system 1 can make a transition to a stop state S3.

The stop state S3, a travelable state S4, and a traveling state S5 are states in which the driving source of the vehicle V can be operated. These states are collectively referred to as an IG ON state S10. Using an operation to start the driving source of the vehicle V in the Wake state S2 as a trigger, the vehicle control system 1 makes a transition to the stop state S3. Such an operation is, for example, an operation (IG ON operation) in which an SSSW (Start Stop SWitch) turns an ignition on.

When the vehicle V has an internal combustion engine as a driving source, in the stop state S3, the vehicle V is in a state in which the internal combustion engine is operating or a state in which the internal combustion engine can be started quickly. When the vehicle V has a motor as a driving source, in the stop state S3, the vehicle V is in a state in which the motor can be rotatable, for example, in a state in which electricity can be supplied from an inverter to the motor. In the stop state S3, the vehicle V is not traveling. For example, a state of transmission of the vehicle V, that is, a shift position is in a P-range.

In the stop state S3, when an operation to stop the driving source of the vehicle V is performed, the vehicle V makes a transition to the power-off state S1. Such an operation is, for example, an operation (IG_OFF operation) in which the SSSW turns the ignition of the vehicle V off.

In the stop state S3, when an operation is performed for the vehicle V to travel, the vehicle V makes a transition to the travelable state S4. The travelable state S4 is a state in which the vehicle V can start traveling by an operation of an accelerator pedal from the user. In the travelable state S4, the shift position of the vehicle V is in ranges other than the P-range, and the vehicle V can move forward or backward. For example, when an operation is performed to switch the shift position of the vehicle V from the P-range to another range in the stop state S3, the vehicle V makes a transition to the travelable state S4.

Further, when an operation is performed to switch the shift position of the vehicle V to the P-range in the travelable state S4, the vehicle V makes a transition to the stop state S3.

The travelable state S4 may include a state in which the vehicle V is moving in addition to the state in which the vehicle V is completely stopped. For example, the travelable state S4 may include a case where the speed of the vehicle V is so low that the vehicle V can be regarded as being stopped. As an example, the travelable state S4 of the present embodiment includes a state in which the vehicle V is traveling forward or backward and the speed of the vehicle V is low.

The traveling state S5 is a state in which the vehicle V is traveling.

In the present embodiment, when the speed of the vehicle V becomes equal to or higher than a first speed in the travelable state S4, the vehicle V makes a transition to the traveling state S5. Further, when the speed of the vehicle V becomes equal to or lower than a second speed in the traveling state S5, the vehicle V makes a transition to the travelable state S4 from the traveling state S5. The first speed is, for example, 10 km/h, and the second speed is, for example, 5 km/h. The first speed and the second speed are thresholds for determining whether the vehicle V is in the travelable state S4 or in the traveling state S5. The first speed and the second speed may be equal to each other. When the second speed is set to a value lower than the first speed, the operating state can be avoided from being frequently changed, which is preferable.

In the vehicle control system 1, for example, the central ECU 2 monitors and determines the operating state of the vehicle V. In addition, the ECU 30 can specify the operating state of the vehicle V by acquiring the operating state of the vehicle V or changes in the operating state from the central ECU 2. Further, the ECU 30 may determine the operating state of the vehicle V by acquiring information about the speed of the vehicle V from the central ECU 2.

Figures 4A, 4B:
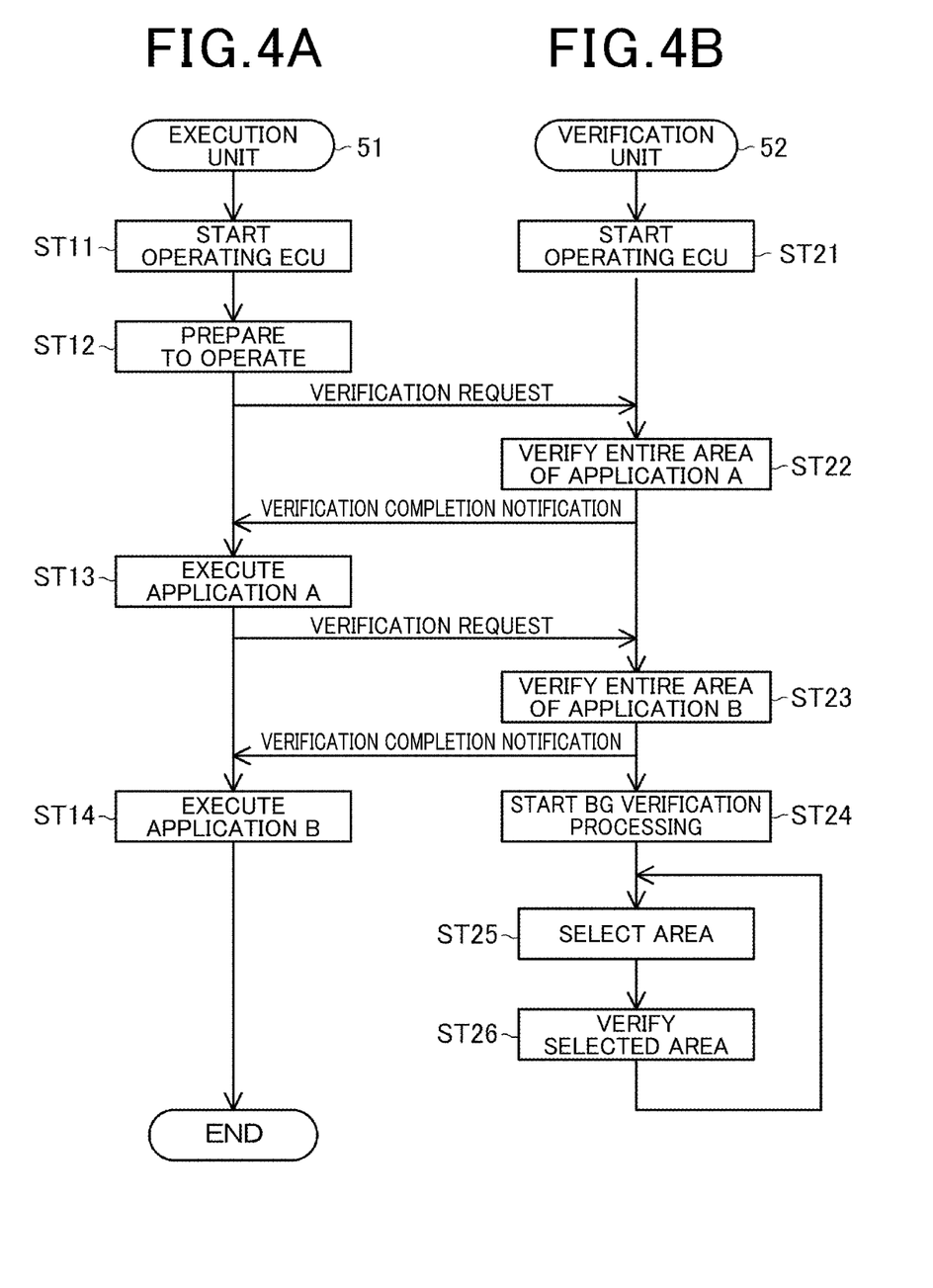
FIGS. 4A and 4B are flowcharts showing an operation example of an ECU.

FIGS. 4A and 4B are flowcharts showing an operation example of the ECU 30, and show an operation when the ECU 30 starts operating. Steps ST11 to ST14 in FIG. 4A show the operation of the execution unit 51, and steps ST21 to ST26 in FIG. 4B show the operation of the verification unit 52. In the operation example shown in FIGS. 4A and 4B, the application A 62 is executed after the start of operation of the ECU 30, and then the application B 63 is executed.

The execution unit 51 and the verification unit 52 start operating by the start of operation of the ECU 30 (steps ST11 and ST21). The execution unit 51 prepares to the start of operation of the application A 62 and the application B 63 by executing the OS 61 (step ST12). Here, the execution unit 51 performs a verification request with respect to the verification unit 52, and the verification unit 52 verifies the application A 62 in response to the verification request (step ST22). In step ST22, the verification unit 52 verifies the entire application A 62 in a state in which the areas A1 to AX are not divided. Such verification is called total verification.

The verification unit 52 performs verification completion notification with respect to the execution unit 51 when the total verification of the application A 62 is completed. Upon receiving the verification completion notification from the verification unit 52, the execution unit 51 executes the application A 62 (step ST13). Subsequently, when the execution unit 51 performs a verification request for the application B 63 with respect to the verification unit 52, the verification unit 52 performs total verification of the application B 63 (step ST23). After the total verification of the application B 63 is completed, the verification unit 52 performs verification completion notification with respect to the execution unit 51, and the execution unit 51 executes the application B 63 based on the verification completion notification (step ST14).

In steps ST11 to ST14 and steps ST21 to ST24, the verification unit 52 verifies the application A 62 and the application B 63, and after the verification is completed, the execution unit 51 executes the application A 62 and the application B 63. In this operation example, when the ECU 30 starts operating, a test is performed to execute all the application programs executed by the ECU 30.

In the vehicle control system 1, the verification unit 52 verifies the application program while the execution unit 51 executes the application program. Such verification is performed in a mode of executing the application program for each area in a verification environment. After the total verification of the application A 62 and the application B 63 is completed, the verification unit 52 starts BG (Background) verification processing (step ST24). In the BG verification processing, the verification unit 52 selects an area of the application program to be verified (step ST25), and verifies the selected area (step ST26).

In the BG verification processing, the verification unit 52 sequentially executes processes of steps ST25 and ST26 for the areas A1 to AX of the application A 62 and the areas B1 to BX of the application B 63. The BG verification processing of the verification unit 52 is executed for each area of the application program in the background of the operation of the execution unit 51. In other words, the verification unit 52 repeatedly executes the operations of steps ST25 and ST26 for each area.

The size of resources used for the BG verification processing varies depending on an execution cycle of the BG verification processing. When the BG verification processing is performed in a short cycle, that is, at a high frequency, the resources used for the BG verification processing are large. The ECU 30 changes an execution mode of the BG verification processing such that the BG verification processing by the verification unit 52 does not excessively affect the resources for the execution unit 51 to execute the application program. Examples of the execution mode of the BG verification processing include the execution cycle of the BG verification processing, an execution frequency, the number and size of areas to be verified in one BG verification processing, and a verification method. In the present embodiment, an example in which the ECU 30 changes the execution cycle of the BG verification processing and an example in which the execution frequency of the BG verification processing is changed due to the change of such an execution cycle will be described as the examples of changing the execution mode of the BG verification processing. The BG verification processing corresponds to an example of a verification operation.

Figures 5A, 5B:
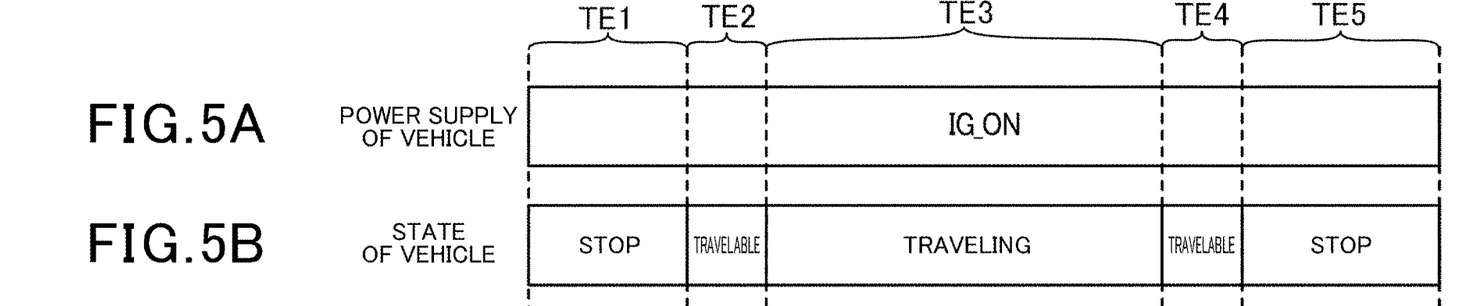
FIGS. 5A to 5D are explanatory diagrams showing an operation example of the vehicle control system.
Figure 5C:
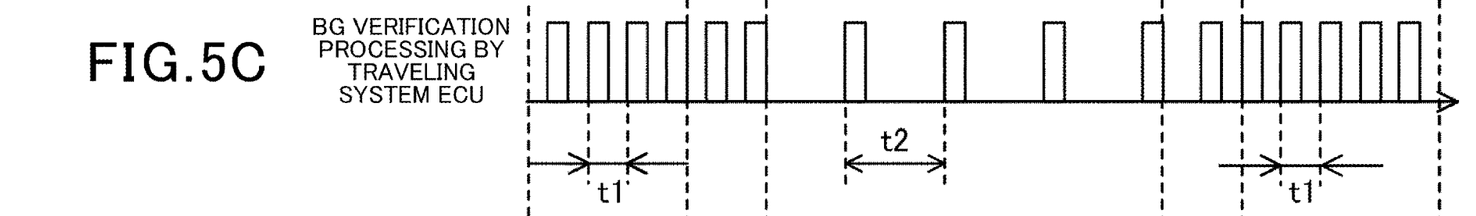
Figure 5D:
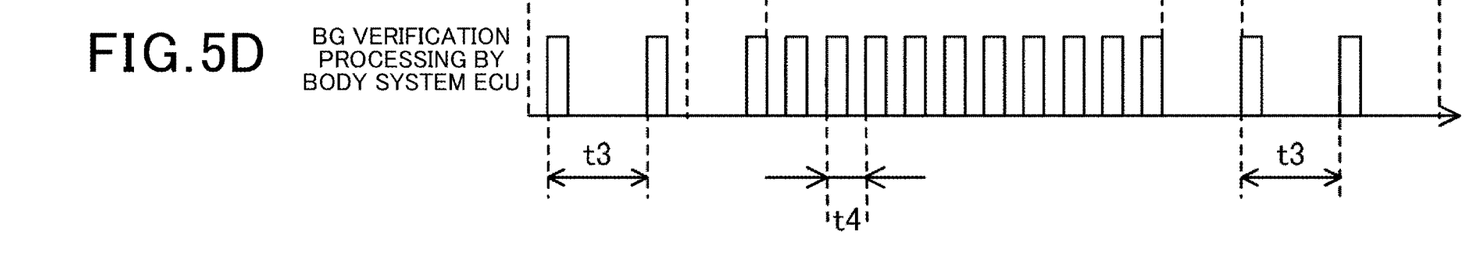

FIGS. 5A to 5D are explanatory diagrams showing the operation example of the vehicle control system 1. Specifically, FIGS. 5A to 5D are timing charts in which a horizontal axis is a time axis, FIG. 5A shows a power supply state of the vehicle control system 1, and FIG. 5B shows an operating state of the vehicle V. FIG. 5C shows an execution state of BG verification processing executed by the ECU 30 belonging to the traveling system ECU 41, and FIG. 5D shows an execution state of BG verification processing executed by the ECU 30 belonging to the body system ECU 42.

FIGS. 5A to 5D show execution states of the BG verification processing while the vehicle V transitions among the stop state S3, the travelable state S4, and the traveling state S5. The operating state of the vehicle V is the stop state S3 during a period of time TE1, is the travelable state S4 during a period of time TE2, is the traveling state S5 during a period of time TE3, is the travelable state S4 during a period of time TE4, and is the stop state S3 during a period of time TE5.

From the period of time TE1 to the period of time TE5, the power supply state of the vehicle control system 1 is in the IG ON state S10.

The ECU 30 belonging to the traveling system ECU 41 performs processing related to driving and braking of the vehicle V. For this reason, a processing load of the processor 31 is high regarding the function of the execution unit 51 while the vehicle V is traveling. Therefore, it is preferable to make the execution frequency of the BG verification processing by the verification unit 52 in the traveling state S5 low, since the overload of the processor 31 can be prevented. In contrast, in the state where the vehicle V is not traveling, that is, in the stop state S3 and the travelable state S4, the frequency is low with which the ECU 30 belonging to the traveling system ECU 41 executes the processing by the execution unit 51. For this reason, the processing load of the processor 31 in the stop state S3 and the travelable state S4 has a margin. Therefore, even when the verification unit 52 performs the BG verification processing with a high frequency in the stop state S3 and the travelable state S4, the processor 31 is unlikely to be overloaded.

On the other hand, the ECU 30 belonging to the body system ECU 42 performs processing related to the doors of the vehicle V. For this reason, a processing load of the processor 31 is high regarding the function of the execution unit 51 while the vehicle V is stopped. Therefore, it is preferable to make the execution frequency of the BG verification processing by the verification unit 52 in the stop state S3 and the travelable state S4 low, since the overload of the processor 31 can be prevented. In contrast, in the state where the vehicle V is traveling, the frequency is low with which the ECU 30 belonging to the body system ECU 42 executes the processing by the execution unit 51. For this reason, the processing load of the processor 31 in the traveling state S5 has a margin. Therefore, even when the verification unit 52 performs the BG verification processing with a high frequency in the traveling state S5, the processor 31 is unlikely to be overloaded.

In the present embodiment, the ECU 30 belonging to the traveling system ECU 41 makes the execution frequency of the BG verification processing in the stop state S3 and the travelable state S4 high, and makes the execution frequency of the BG verification processing in the traveling state S5 low. In addition, the ECU 30 belonging to the body system ECU 42 makes the execution frequency of the BG verification processing in the stop state S3 and the travelable state S4 low, and makes the execution frequency of the BG verification processing in the traveling state S5 high. Thus, it is possible to perform the verification of the application A 62 and the application B 63 at a required frequency while avoiding a situation where the processor 31 is overloaded.

Specifically, as shown in FIG. 5C, the ECU 30 belonging to the traveling system ECU 41 executes the BG verification processing at a cycle t1 during the periods of time TE1 and TE2. When the vehicle V has made a transition to the traveling state S5, that is, during the period of time TE3, the ECU 30 changes a cycle of the BG verification processing to a cycle t2. The cycle t2 is longer than the cycle t1. Therefore, the execution frequency of the BG verification processing during the period of time TE3 is lower than the execution frequency of the BG verification processing during the periods of time TE1 and TE2. Further, during periods of time TE4 and TE5, a cycle in which the ECU 30 executes the BG verification processing is defined as a cycle t1. During the periods of time TE4 and TE5, the speed of the vehicle V becomes equal to or lower than the second speed, and the vehicle V makes a transition to the travelable state S4 or the stop state S3, whereby the execution frequency of the BG verification processing is made high.

In addition, as shown in FIG. 5D, the ECU 30 belonging to the body system ECU 42 executes the BG verification processing at a cycle t3 during the periods of time TE1 and TE2. When the vehicle V has made a transition to the traveling state S5, that is, during the period of time TE3, the ECU 30 changes a cycle of the BG verification processing to a cycle t4. The cycle t4 is shorter than the cycle t3. Therefore, the execution frequency of the BG verification processing during the period of time TE3 is higher than the execution frequency of the BG verification processing during the periods of time TE1 and TE2. Further, during the periods of time TE4 and TE5, a cycle in which the ECU 30 executes the BG verification processing is defined as a cycle t3. During the periods of time TE4 and TE5, the speed of the vehicle V becomes equal to or lower than the second speed, and the vehicle V makes a transition to the travelable state S4 or the stop state S3, whereby the execution frequency of the BG verification processing is made low.

In this way, the ECU 30 changes the execution frequency of the BG verification processing by changing the execution cycle of the BG verification processing according to the traveling state of the vehicle V. The ECU 30 may change the execution cycle of the BG verification processing, or the central ECU 2 or the gateway ECU 20 may instruct the ECU 30 to change the execution cycle. In the present embodiment, an example will be described with reference to FIG. 6 in which the ECU 30 changes the execution cycle of the BG verification processing.

Figure 6:
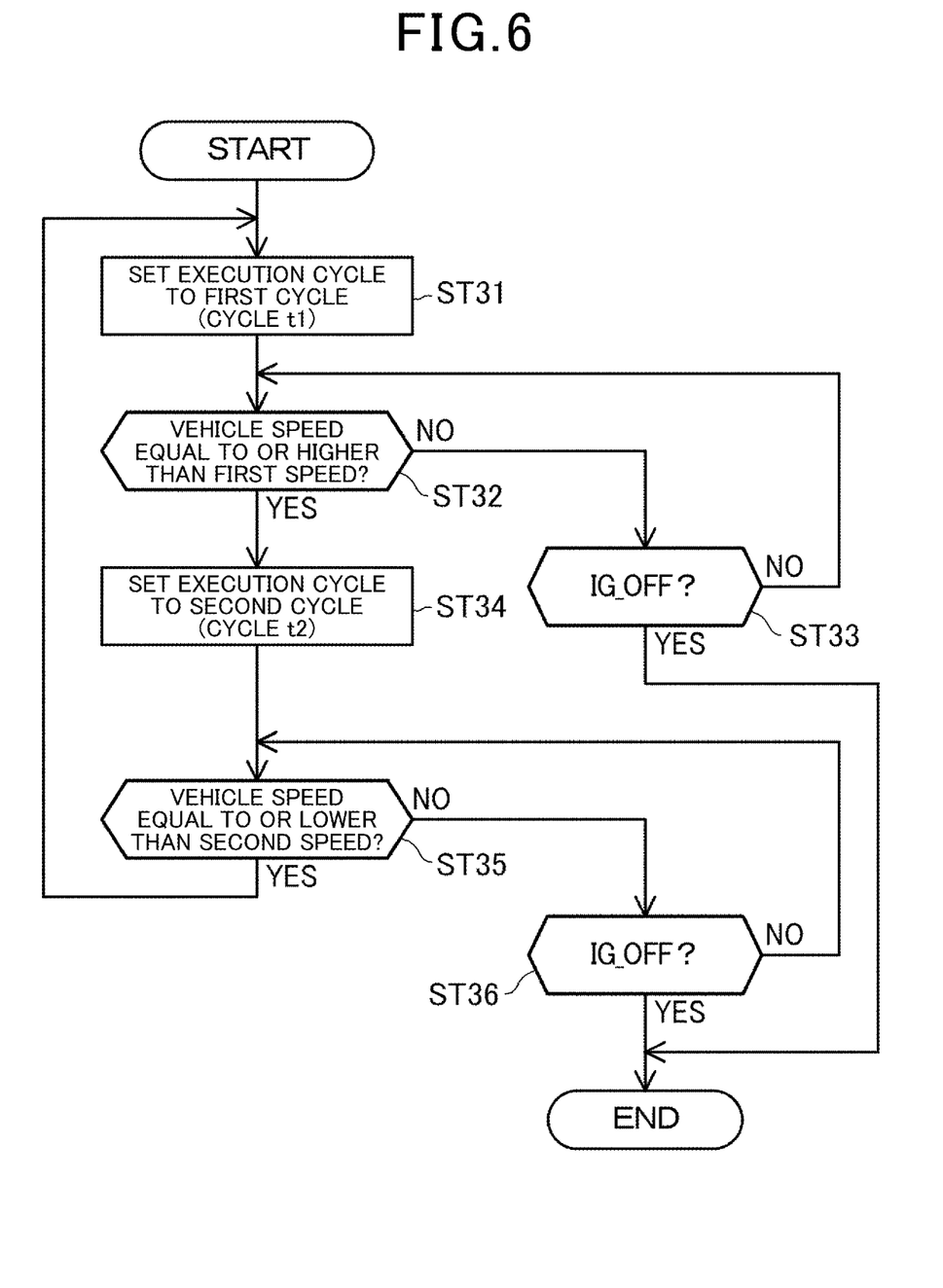
FIG. 6 is a flowchart showing an operation example of the ECU.

FIG. 6 is a flowchart showing an operation example of the ECU 30. FIG. 6 shows an operation in which the verification unit 52 changes the execution frequency of the BG verification processing after starting the BG verification processing. Operations of step ST31 to step ST36 are executed by the verification unit 52, for example.

First, the operation of the ECU 30 belonging to the traveling system ECU 41 will be described.

After starting the BG verification processing in step ST24 (see FIGS. 4A and 4B), the ECU 30 sets the execution cycle of the BG verification processing to a first cycle (step ST31). The first cycle is the cycle t1 in the examples of FIGS. 5A to 5D. The execution frequency of the BG verification processing is set to a first frequency by the process of step ST31.

The ECU 30 determines whether the speed of the vehicle V is equal to or higher than the first speed (step ST32). In step ST32, the ECU 30 makes determination by acquiring information about the speed of the vehicle V from the central ECU 2, for example. At a start point of time of the processing of FIG. 6, the vehicle V is in the stop state S3 or the travelable state S4. The determination in step ST32 is to determine whether the operating state of the vehicle V has made a transition from the travelable state S4 to the traveling state S5.

When it is determined that the speed of the vehicle V is not equal to or higher than the first speed (NO in step ST32), the ECU 30 determines whether the vehicle control system 1 has made a transition to an ignition-off state (step ST33). The determination in step ST33 is to determine whether the vehicle control system 1 has made a transition from the IG ON state S10 to the power-off state S1. When it is determined that the vehicle control system 1 has made a transition to the ignition-off state (YES in step ST33), the ECU 30 ends this processing. When the ECU 30 determines that the vehicle control system 1 has not yet make a transition to the ignition-off state (NO in step ST33), the process returns to step ST32.

When it is determined that the speed of the vehicle V is equal to or higher than the first speed (YES in step ST32), the ECU 30 sets the execution cycle of the BG verification processing to a second cycle (step ST34). The second cycle is the cycle t2 in the examples of FIGS. 5A to 5D. Since the cycle t2 is longer than the cycle t1, the execution frequency of the BG verification processing is set to a second frequency lower than the first frequency by the process of step ST34.

Thereafter, the ECU 30 determines whether the speed of the vehicle V is equal to or lower than the second speed (step ST35). In step ST35, the ECU 30 makes determination by acquiring information about the speed of the vehicle V from the central ECU 2, for example. The determination in step ST35 is to determine whether the operating state of the vehicle V has made a transition from the traveling state S5 to the travelable state S4.

When it is determined that the speed of the vehicle V is not equal to or lower than the second speed (NO in step ST35), the ECU 30 determines whether the vehicle control system 1 has made a transition to the ignition-off state (step ST36). The determination in step ST36 is to determine whether the vehicle control system 1 has made a transition from the IG ON state S10 to the power-off state S1. When it is determined that the vehicle control system 1 has made a transition to the ignition-off state (YES in step ST36), the ECU 30 ends this processing. When the ECU 30 determines that the vehicle control system 1 has not yet make a transition to the ignition-off state (NO in step ST36), the process returns to step ST35.

When the ECU 30 determines that the speed of the vehicle V is equal to or lower than the second speed (YES in step ST35), the process proceeds to step ST31, and the ECU 30 sets the execution cycle of the BG verification processing to the first cycle.

Subsequently, the operation of the ECU 30 belonging to the body system ECU 42 will be described.

Like the ECU 30 belonging to the traveling system ECU 41, the ECU 30 belonging to the body system ECU 42 executes the operations shown in FIG. 6. In this case, the ECU 30 sets the execution cycle of the BG verification processing to a third cycle in step ST31. The third cycle is the cycle t3 in the examples of FIGS. 5A to 5D. The execution frequency of the BG verification processing is set to a third frequency by the process of step ST31. Further, the ECU 30 sets the execution cycle of the BG verification processing to a fourth cycle in step ST34. The fourth cycle is the cycle t4 in the examples of FIGS. 5A to 5D. The execution frequency of the BG verification processing is set to a fourth frequency by the process of step ST34. The third cycle is longer than the fourth cycle. Therefore, the third frequency is lower than the fourth frequency.

In this way, the ECU 30 changes the execution frequency of the BG verification processing in the case where the vehicle V is in the traveling state S5 and in the case where the vehicle V is in the stop state S3 or the travelable state S4. In other words, the ECU 30 belonging to the traveling system ECU 41 executes the BG verification processing with the first frequency when the vehicle V is in the stop state S3 or the travelable state S4, and executes the BG verification processing with the second frequency lower than the first frequency when the vehicle V is in the traveling state S5. The ECU 30 belonging to the body system ECU 42 executes the BG verification processing with the third frequency when the vehicle V is in the stop state S3 or the travelable state S4, and executes the BG verification processing with the fourth frequency higher than the third frequency when the vehicle V is in the traveling state S5. Thus, it is possible to execute the verification of the application program to be executed by the processor 31 so as not to overload the processor 31 according to the function of the vehicle V executed by the ECU 30.

In the operation of FIG. 6, the ECU 30 determines the speed of the vehicle V in steps ST32 and ST35 to determine whether the operating state of the vehicle V is the traveling state S5, or is the stop state S3 or the travelable state S4. As described above, the processor 31 of the ECU 30 belonging to the traveling system ECU 41 has a large load in the traveling state S5, and the processor 31 of the ECU 30 belonging to the body system ECU 42 has a large load in the operating states other than the traveling state S5. Therefore, the determinations in steps ST32 and ST35 are to determine the traveling state of the vehicle V and to determine the load state of the processor 31 based on the traveling state of the vehicle V.

In addition, for each of the ECUs 30, whether the ECU 30 belongs to the traveling system ECU 41 or the body system ECU 42 is defined. For this reason, the determinations made by the ECU 30 in steps ST32 and ST35 are to determine the load state of the processor 31 based on the function of the vehicle V related to the ECU 30 and the traveling state of the vehicle V.

The above-described embodiment shows a specific example to which the present invention is applied, and does not limit the form to which the present invention is applied.

In the above-described embodiment, an example is shown in FIG. 6 in which the ECU 30 determines the speed of the vehicle V, but is merely an example. For example, the central ECU 2 or the gateway ECU 20 may determine whether the operating state of the vehicle V is any of the stop state S3, the travelable state S4, and the traveling state S5, and may output the determination result to the ECU 30.

In the above-described embodiment, an example has been described in which the verification unit 52 executes the total verification and the BG verification processing with respect to the application program to be executed by the processor 31. The program verified by the verification unit 52 is not limited to the application program. For example, the verification unit 52 may execute the BG verification processing with respect to the OS 61 or other control programs.

FIGS. 5A to 5D show an example in which the execution frequency of the BG verification processing during the periods of time TE1 and TE2 is equal to the execution frequency of the BG verification processing during the periods of time TE4 and TE5, but are merely an example. For example, the execution frequency of the BG verification processing during the periods of time TE1 and TE2 may be different from the execution frequency of the BG verification processing during the periods of time TE4 and TE5. Further, the execution frequency of the BG verification processing may be different between the periods of time TE1 and TE2, and the execution frequency of the BG verification processing may be different between the periods of time TE4 and TE5.

FIGS. 1 and 2 are schematic diagrams showing functional configuration of each device of the vehicle control system 1 divided according to the main processing contents for easy understanding of the present invention, and are not limited to the configuration of the device. Each of the processes shown in FIGS. 4A, 4B, and 6 may be executed by one program or may be executed by a plurality of programs.

In addition, the vehicle V is, for example, a four-wheeled vehicle, but the type of the vehicle V is not particularly limited, and may be a large-sized vehicle, a commercial vehicle, a two-wheeled vehicle, or a three-wheeled vehicle, for example. Additionally, the configuration of each component in the vehicle control system 1 can be arbitrarily changed.

A part or all of the OS 61, the application A 62, the application B 63, and other programs in the ECU 30 can be recorded in a computer-readable non-transitory storage medium or a recording medium, for example. In this case, the present invention is implemented as a non-transitory storage medium in which a computer program is recorded. Specifically, the present invention can be implemented as a storage medium in which the program is stored so as to be readable by the central ECU 2, the gateway ECU 20, or the ECU 30, which is a computer constituting the vehicle control system 1. A magnetic storage medium, an optical storage medium, or a semiconductor memory device can be used as the storage medium, which may be fixed to the vehicle control system 1 or may be detachably attached to the vehicle control system 1.

The above-described embodiment supports the following configurations.

(Configuration 1) A control device that controls a device equipped in a vehicle by executing a program, the control device including: a storage unit that stores the program; and a processor, the processor being configured to be capable of executing a verification operation of partially executing and verifying the program after starting execution of the program stored in the storage unit, and change an execution mode of the verification operation according to a load state of the processor.

According to the control device of Configuration 1, since the control device for controlling the device equipped in the vehicle can verify the program that controls the device while reducing the influence on the control of the device, opportunities to verify the program can be increased. Therefore, it is possible to stabilize the operation of the program and prevent inappropriate behavior of the program, which can contribute to the advancement of sustainable transport systems.

(Configuration 2) In the control device according to Configuration 1, the processor is configured to determine the load state of the processor based on a traveling state of the vehicle, and change the execution mode of the verification operation according to a determination result.

According to the control device of Configuration 2, since the mode of the program verification is changed based on the traveling state of the vehicle, the program can be verified such that the verification operation does not cause overloading of the processor.

(Configuration 3) In the control device according to Configuration 1 or 2, the processor is configured to determine the load state of the processor based on a function of the vehicle related to the program and the traveling state of the vehicle, and change the execution mode of the verification operation according to a determination result.

According to the control device of Configuration 3, since the mode of the program verification is changed based on the vehicle function related to the program and the vehicle traveling state, the program can be verified such that the verification operation does not cause overloading of the processor.

(Configuration 4) In the control device according to any one of Configurations 1 to 3, the processor is configured to: execute the program related to traveling control of the vehicle; be capable of setting an execution frequency of the verification operation to a first frequency and a second frequency lower than the first frequency; and set the execution frequency of the verification operation to the second frequency when a speed of the vehicle is equal to or greater than a first speed and set the execution frequency of the verification operation to the first frequency when the speed of the vehicle is equal to or lower than a second speed.

According to the control device of Configuration 4, the control device for executing the program related to the traveling control of the vehicle makes the execution frequency of the verification operation low while the vehicle is traveling, and makes the execution frequency of the verification operation high while the vehicle is not traveling or is traveling at low speed. Thus, the execution frequency of the verification operation can be made low to prevent the overload of the processor when the load on the traveling control of the vehicle by the program is high, and the execution frequency of the verification operation can be made high to increase the opportunities of verification when the load on the traveling control of the vehicle is low.

(Configuration 5) In the control device according to any one of Configurations 1 to 3, the processor is configured to: execute the program related to equipment that operates when a user ascends or descends the vehicle; be capable of setting an execution frequency of the verification operation to a third frequency and a fourth frequency higher than the third frequency; and set the execution frequency of the verification operation to the fourth frequency when a speed of the vehicle is equal to or greater than a first speed and set the execution frequency of the verification operation to the third frequency when the speed of the vehicle is equal to or lower than a second speed.

According to the control device of Configuration 5, the control device for executing the program related to the equipment that operates when the user ascends or descends the vehicle makes the execution frequency of the verification operation high while the vehicle is traveling, and makes the execution frequency of the verification operation low while the vehicle is not traveling or is traveling at low speed. Thus, the execution frequency of the verification operation can be made low to prevent the overload of the processor in a state where there is a high possibility that the equipment that operates when the user ascends or descends the vehicle is used, and the execution frequency of the verification operation can be made high to increase the opportunities of verification in a state where there is a low possibility that the equipment is used.

(Configuration 6) A control method in which a control device including a storage unit and a processor executes a program stored in the storage unit to control a device equipped in a vehicle, the control method by the processor including: executing a verification operation of partially executing and verifying the program after starting execution of the program stored in the storage unit; and changing an execution mode of the verification operation according to a load state of the processor.

According to the control method of Configuration 6, since the control device for controlling the device equipped in the vehicle can verify the program that controls the device while reducing the influence on the control of the device, opportunities to verify the program can be increased. Therefore, it is possible to stabilize the operation of the program and prevent inappropriate behavior of the program, which can contribute to the advancement of sustainable transport systems.

(Configuration 7) A storage medium storing a control program to be executed by a control device that includes a storage unit and a processor and controls a device equipped in a vehicle, the control program causing the processor to: be capable of executing a verification operation of partially executing and verifying the program after the processor starts execution of the program stored in the storage unit; and change an execution mode of the verification operation according to a load state of the processor.

According to the program storing the storage medium of Configuration 7, since it is possible to verify the program that controls the device while reducing the influence on the control of the device equipped in the vehicle, opportunities to verify the program can be increased. Therefore, it is possible to stabilize the operation of the program and prevent inappropriate behavior of the program, which can contribute to the advancement of sustainable transport systems.

REFERENCE SIGNS LIST 1 vehicle control system
2 central ECU
4, 4a to 4c communication line
20 gateway ECU
20a first gateway ECU
20b second gateway ECU
20c third gateway ECU
30, 30a to 30i ECU (controller)
31 processor
32 memory (storage unit)
41 traveling system ECU (controller)
42 body system ECU (controller)
51 execution unit
52 verification unit
61 OS
62 application A
63 application B
V vehicle

What is claimed is:

1. A control device that controls a device equipped in a vehicle by executing a program related to traveling control of the vehicle, the control device comprising:
a memory that stores the program; and
a processor,
the processor being configured to:
divide, in a background, the program into a plurality of areas while executing the program stored in the memory, select an area of the program to be verified, and be capable of repeatedly executing, for each of the plurality of areas, a verification operation of executing and verifying the area selected;
determine a load state of the processor based on a function of the vehicle related to the program and a traveling state of the vehicle; and
change an execution frequency of the verification operation according to a load state of the processor,
wherein, in changing the execution frequency of the verification operation according to the load state of the processor, the processor, when the vehicle is moving, sets the execution frequency of the verification operation to a second frequency when a speed of the vehicle is equal to or greater than a first speed and sets the execution frequency of the verification operation to a first frequency when the speed of the vehicle is equal to or lower than a second speed, wherein the second frequency is lower than the first frequency.

2. The control device according to claim 1, wherein the processor is configured to:

when the vehicle is in the traveling state, the execution frequency of the verification operation of the program of the device related to traveling control of the vehicle is set to be lower than an execution frequency of a verification operation of a program of a device not related to traveling control, and when the vehicle is in a stop state, the execution frequency of the verification operation of the program of the device related to traveling control is set to be higher than the execution frequency of the verification operation of the program of the device not related to traveling control.

3. A control method in which a control device including a memory and a processor executes a program stored in the memory to control a device equipped in a vehicle, the control method by the processor comprising:

dividing, in a background, the program into a plurality of areas while executing the program stored in the memory, selecting an area of the program to be verified, and repeatedly executing, for each of the plurality of areas, a verification operation of executing and verifying the area selected;

determining a load state of the processor based on a function of the vehicle related to the program and a traveling state of the vehicle; and changing an execution frequency of the verification operation according to the load state of the processor, wherein, in changing the execution frequency of the verification operation according to the load state of the processor, when the vehicle is moving, the execution frequency of the verification operation is set to a second frequency when a speed of the vehicle is equal to or greater than a first speed and the execution frequency of the verification operation is set to a first frequency when the speed of the vehicle is equal to or lower than a second speed, wherein the second frequency is lower than the first frequency.

4. A non-transitory computer-readable storage medium storing a control program to be executed by a control device that includes a memory and a processor and controls a device equipped in a vehicle, the control program causing the processor to:

divide, in a background, the program into a plurality of areas while executing the program stored in the memory, select an area of the program to be verified, and be capable of repeatedly executing, for each of the plurality of areas, a verification operation of executing and verifying the area selected;

determine a load state of the processor based on a function of the vehicle related to the program and a traveling state of the vehicle; and change an execution frequency of the verification operation according to the load state of the processor, wherein, in changing the execution frequency of the verification operation according to the load state of the processor, the processor, when the vehicle is moving, sets the execution frequency of the verification operation to a second frequency when a speed of the vehicle is equal to or greater than a first speed and sets the execution frequency of the verification operation to a first frequency when the speed of the vehicle is equal to or lower than a second speed, wherein the second frequency is lower than the first frequency.

* * * * *